(12) United States Patent
Nomaguchi

(10) Patent No.: US 9,259,881 B2
(45) Date of Patent: Feb. 16, 2016

(54) METHOD FOR PRODUCING A FORMED ARTICLE COMPRISED OF A FIBER

(71) Applicant: NOMAGUCHI INCORPORATION, Meguro-ku, Tokyo (JP)

(72) Inventor: Kanemasa Nomaguchi, Meguro-ku (JP)

(73) Assignee: NOMAGUCHI INCORPORATION, Meguro-Ku, Tokyo (JP)

( * ) Notice: Subject to any disclaimer, the term of this patent is extended or adjusted under 35 U.S.C. 154(b) by 0 days.

(21) Appl. No.: 14/412,141

(22) PCT Filed: Jul. 4, 2013

(86) PCT No.: PCT/JP2013/068357
§ 371 (c)(1),
(2) Date: Dec. 30, 2014

(87) PCT Pub. No.: WO2014/007324
PCT Pub. Date: Jan. 9, 2014

(65) Prior Publication Data
US 2015/0136300 A1    May 21, 2015

(30) Foreign Application Priority Data

Jul. 4, 2012   (JP) ................................. 2012-150275
Jun. 21, 2013  (JP) ................................. 2013-130968

(51) Int. Cl.
B29C 53/60   (2006.01)
B29C 70/10   (2006.01)
B29C 70/30   (2006.01)
B29C 70/32   (2006.01)

(52) U.S. Cl.
CPC ................. *B29C 70/10* (2013.01); *B29C 70/30* (2013.01); *B29C 53/602* (2013.01); *B29C 70/32* (2013.01); *Y10T 156/10* (2015.01)

(58) Field of Classification Search
CPC .... B29C 53/587; B29C 53/60; B29C 53/602; B29C 70/32; B29C 70/86; B29C 70/865
USPC .................................................. 156/172, 175
See application file for complete search history.

(56) References Cited

U.S. PATENT DOCUMENTS 2,614,058 A * 10/1952 Francis ......................... 156/171
5,321,622 A    6/1994 Snead et al.
5,345,391 A    9/1994 Hull et al.
5,481,470 A    1/1996 Snead et al.

(Continued)

FOREIGN PATENT DOCUMENTS

GB    2123056 A    1/1984
JP    59003063 A   1/1984

(Continued)

OTHER PUBLICATIONS

International Search Report (ISR) dated Sep. 17, 2013 issued in International Application No. PCT/JP2013/068357.

*Primary Examiner* — Carson Gross
(74) *Attorney, Agent, or Firm* — Holtz, Holtz & Volek PC

(57) ABSTRACT

A task of the present invention is to provide a method for producing a formed article comprised of a fiber without using a frame having a fixed form. A method for producing a formed article having a layer comprising a fiber, wherein the method comprises the steps of: (1) forming a linear framework; and (2) allowing the fiber to adhere onto the linear framework to form the layer.

9 Claims, 6 Drawing Sheets

A

C

(56) References Cited

U.S. PATENT DOCUMENTS

| | | | |
|---|---|---|---|
| 5,854,748 A | 12/1998 | Snead et al. | |
| 6,007,656 A * | 12/1999 | Heikkila et al. | 156/180 |
| 6,299,246 B1 | 10/2001 | Tomka | |
| 6,333,741 B1 | 12/2001 | Snead et al. | |
| 2010/0065192 A1* | 3/2010 | Wilson et al. | 156/180 |
| 2011/0281082 A1* | 11/2011 | Wilson | 428/178 |

FOREIGN PATENT DOCUMENTS

| | | |
|---|---|---|
| JP | 59038011 A | 3/1984 |
| JP | 61005928 A | 1/1986 |
| JP | 2000015706 A | 1/2000 |
| JP | 2001501714 A | 2/2001 |
| JP | 2006264280 A | 10/2006 |

* cited by examiner

A            C

A            C

A　　　　　　　　　　C

A

X

Y

Z

METHOD FOR PRODUCING A FORMED ARTICLE COMPRISED OF A FIBER

FIELD OF THE INVENTION

The present invention relates to a method for producing a formed article comprised of a fiber.

BACKGROUND ART

A filament winding method (hereinafter, frequently referred to simply as "FW method") is a method in which a filament having an adhesive resin applied thereto is wound round a tubular mold to form a tubular article. The tubular article obtained by an FW method is lightweight and has excellent mechanical properties and physical and chemical properties, which are derived from the physical properties of the filament, and hence has been used in various fields (for example, patent document 1).

Further, a three-dimensionally shaping apparatus for automatically forming a three-dimensional object based on the coordinates data about the three-dimensional object digitally designed by a computer, such as CAD, is disclosed (patent document 2).

PRIOR ART REFERENCES

Patent Documents

Patent document 1: Japanese Unexamined Patent Publication No. 2006-264280
Patent document 2: Japanese Unexamined Patent Publication No. 2000-015706

DISCLOSURE OF THE INVENTION

Problems to be Solved by the Invention

However, the mold used in the FW method is limited to a uniaxisymmetric form, and a mold in the form selected according to the purpose must be produced each time, so that the form of the tubular article produced and the production efficiency are restricted.

Further, the three-dimensionally shaping apparatus disclosed in patent document 2 needs an extremely complicated step such that, upon automatically forming a three-dimensional object based on the coordinates data, while forming a liquid photosensitive fiber layer on the framework unit specified by the coordinates and curing it, a liquid photosensitive fiber layer is successively formed on the adjacent framework unit.

A task of the present invention is to provide a method for producing a formed article comprised of a fiber without using a mold having a fixed form.

Means to Solve the Problems

The present invention is directed to a method for producing a formed article having a layer comprising a fiber, wherein the method comprises the steps of:

(1) forming a linear framework; and
(2) allowing the fiber to adhere onto the linear framework to form the layer.

Effect of the Invention

In the present invention, there can be provided a method for producing a formed article comprised of a fiber without using a mold having a fixed form.

BRIEF DESCRIPTION OF THE DRAWINGS

FIG. 6-1 is an example of the process for producing an egg-shaped formed article.
FIG. 6-2 is an example of the process for producing an egg-shaped formed article.

BEST MODE FOR CARRYING OUT THE INVENTION

(1) Linear Framework

Figure 1:
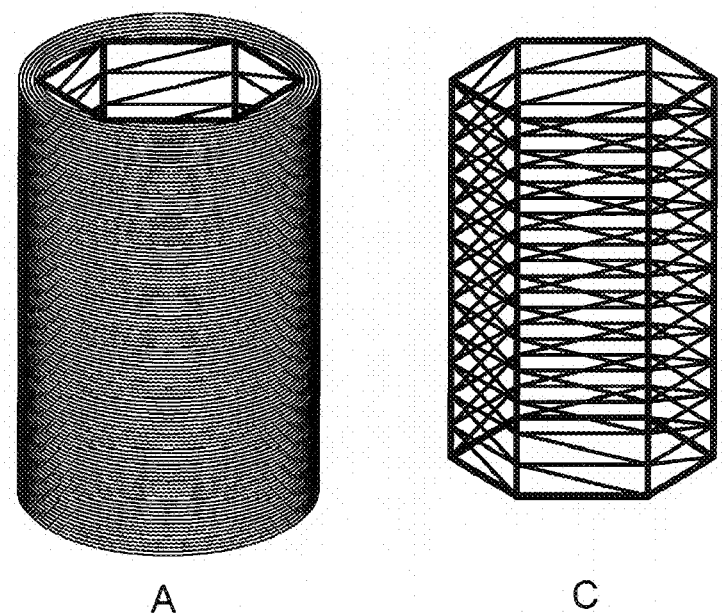
FIG. 1 is an example of a cylindrical formed article and the linear framework thereof.

In a linear framework in the present invention (hereinafter, frequently referred to simply as "a linear framework"), the frame form required for forming a layer (hereinafter, frequently referred to as "fiber-comprised layer") comprised of a fiber (hereinafter, frequently referred to as "layer forming fiber") contained in the formed article in the present invention (hereinafter, frequently referred to simply as "formed article") is comprised of a linear material, and is a structure which can stably maintain the frame form in a space.

In the linear framework, the maximum of the number of the linear materials which lie on one another is preferably 10 or less, more preferably 7 or less, further preferably 4 or less.

The linear framework may be formed by dividing a desired form of the formed article into, for example, triangular, very small linear elements used in a finite-element analysis, and forming the sides constituting each very small linear element from a solid material.

When it is intended to obtain a desired form of the formed article with a desired precision, the above-mentioned division can be made roughly or finely according to the precision.

When a desired form of the formed article is a simple form, such as a uniaxisymmetric form, e.g., a cylinder, the linear framework can be constructed with ease.

Also, when the layer forming fiber can be fixed with precision to form the fiber-comprised layer in a precise form, the linear framework can be constructed with ease.

The solid material constituting the linear framework may be at least one member selected from the group consisting of a metal, an inorganic material, and an organic material.

With respect to the framework which serves as a frame for stably maintaining the frame form of the linear framework in a space, from the viewpoint of the need of a certain strength, a tough inorganic material, such as a metal or a ceramic, is preferred.

When the linear framework is incorporated into the formed article as a constituent material for the formed article, from the viewpoint of achieving a lightweight article, the linear framework is preferably an organic material.

Therefore, the linear framework may be comprised of, for example, a metallic framework, which serves as a frame for stably maintaining the frame form of the linear framework in a space, and a lightweight framework, such as a plastic or a fiber.

When a metal is used as the solid material, from the viewpoint of the strength, at least one metal selected from the group consisting of, for example, stainless steel, titanium, iron, aluminum, duralumin, magnesium, titanium, and copper is preferred, from the viewpoint of the chemical resistance, stainless steel and/or titanium is preferred, from the viewpoint of achieving a lightweight article, at least one metal selected from the group consisting of aluminum, duralumin, and titanium is preferred, and, from the viewpoint of achieving environmental protection, such as recycling or biodegradability, iron and/or aluminum is preferred.

When an inorganic material is used as the solid material, from at least one point of view selected from the group consisting of strength, chemical resistance, and environmental protection, such as recycling or biodegradability, at least one inorganic material selected from the group consisting of, for example, carbon, glass, and a ceramic is preferred, and, from the viewpoint of achieving a lightweight article, carbon and/or glass is preferred.

When an organic material is used as the solid material, from the viewpoint of the strength, at least one organic fiber selected from the group consisting of, for example, polyethylene, polypropylene, polyester, polyimide, flax, and a modified product or derivative thereof is preferred, from the viewpoint of the chemical resistance, at least one organic fiber selected from the group consisting of, for example, polyethylene, polypropylene, polyester, polyimide, and a modified product or derivative thereof is preferred, from the viewpoint of achieving a lightweight article, at least one organic material selected from the group consisting of, for example, polyethylene, polypropylene, polyester, polyimide, flax, and a modified product or derivative thereof is preferred, and, from the viewpoint of achieving environmental protection, such as recycling or biodegradability, at least one organic material selected from the group consisting of, for example, polyethylene, polypropylene, polyester, polyamide, flax, sisal, and a modified product or derivative thereof is preferred.

The diameter of the linear framework can be appropriately selected according to a desired size and desired strength of the formed article.

With respect to the size of the cross-section of the linear framework, when the formed article has a size on the order of several meters to several hundred meters like a rocket, an aircraft, a tanker, or an automobile, the size of the cross-section of the linear framework, in terms of a diameter obtained on the assumption that the cross-section is circular (circle-based diameter), is preferably 0.1 to 100 cm, more preferably 0.5 to 50 cm, further preferably 0.5 to 10 cm, further preferably 0.5 to 5 cm, further preferably 0.5 to 1 cm. When the formed article has a size on the order of several cm to several meters like a part of, for example, a rocket, an aircraft, a tanker, or an automobile, or a tool, the size of the cross-section of the linear framework, in terms of a circle-based diameter, is preferably 0.1 to 10 cm, more preferably 0.1 to 5 cm, further preferably 0.1 to 1 cm, further preferably 0.1 to 0.5 cm, further preferably 0.1 to 0.3 cm, further preferably 0.1 to 0.2 cm. When the formed article is required to be lightweight like a clothing item, accessories, or a medical device, such as an artificial organ, which is used for a living organism having a size equivalent to a human body, the size of the cross-section of the linear framework, in terms of a circle-based diameter, is preferably 0.0001 to 1 cm, more preferably 0.001 to 0.5 cm, further preferably 0.001 to 0.1 cm, further preferably 0.001 to 0.01 cm, further preferably 0.001 to 0.005 cm.

The length of the solid material constituting the linear framework may be the length of each of the sides constituting the linear framework. However, from the viewpoint of the formability of the linear framework, when, for example, the length of each side is extremely long, each side may be constructed by binding short materials together.

The linear framework can be constructed by bonding together solid materials in a rod shape each having a length corresponding to the length of each side constituting the linear framework and having a desired strength. The solid material in a rod shape may be a fibrous solid material as long as the linear framework can be formed from the solid material in a rod shape, even if the solid material is thin. When the fibrous solid material is a fiber, the fiber may be a monofilament, a unidirectional yarn, or a spun yarn (hereinafter, the monofilament and spun yarn are collectively referred to as "filament or the like"). The spun yarn may be a yarn in the form of a knitted cord, such as a lily-yarn.

(2) Layer Forming Fiber

With respect to the layer forming fiber, for example, a metal fiber, an inorganic fiber, or an organic fiber can be used. However, from the viewpoint of achieving a lightweight article and excellent processability, an organic fiber is preferred.

Further, in the present invention, the layer forming fiber includes a filament or the like, and that in the form of a tape having an anisotropic cross-sectional form, and the layer forming fiber may be in the form of a unidirectional tape formed from a plurality of fibers which are oriented in a single direction so as to have a strength.

From the viewpoint of the operating properties upon allowing the layer forming fiber to adhere onto the linear framework or allowing the fiber to adhere together and the precision of the shape formation, the width of the tape is preferably 0.1 to 10 cm, more preferably 1 to 5 cm, further preferably 2 to 4 cm.

The layer forming fiber may twine around another one, and consequently, in the formed article, the fiber-comprised layer may be in a woven form or a nonwoven fabric form.

When a metal fiber is used as the layer forming fiber, from the viewpoint of the strength, at least one metal selected from the group consisting of for example, stainless steel, titanium, iron, aluminum, duralumin, magnesium, titanium, and copper is preferred, from the viewpoint of the chemical resistance, stainless steel and/or titanium is preferred, from the viewpoint of achieving a lightweight article, at least one metal selected from the group consisting of aluminum, duralumin, and titanium is preferred, and, from the viewpoint of achieving environmental protection, such as recycling or biodegradability, iron and/or aluminum is preferred.

From at least one point of view selected from the group consisting of strength, chemical resistance, and environmental protection, such as recycling or biodegradability, at least one inorganic fiber selected from the group consisting of, for example, carbon, glass, and a ceramic is preferred, and, from the viewpoint of achieving a lightweight article, a fiber of carbon and/or glass is preferred.

When an organic fiber is used as the layer forming fiber, from the viewpoint of the strength, at least one organic fiber selected from the group consisting of, for example, polyethylene, polypropylene, polyester, polyimide, flax, and a modified product or derivative thereof is preferred, from the viewpoint of the chemical resistance, at least one organic fiber selected from the group consisting of, for example, polyethylene, polypropylene, polyester, polyimide, and a modified product or derivative thereof is preferred, from the viewpoint of achieving a lightweight article, at least one organic fiber selected from the group consisting of, for example, polyethylene, polypropylene, polyester, polyimide, flax, and a modified product or derivative thereof is preferred, and, from the viewpoint of achieving environmental protection, such as recycling or biodegradability, at least one organic fiber selected from the group consisting of, for example, polyethylene, polypropylene, polyester, polyamide, flax, sisal, and a modified product or derivative thereof is preferred.

From the viewpoint of imparting desired physical properties to the formed article, the organic fiber may be derived from a polymer alloy resin, or derived from a mixed resin of a metal and/or an inorganic material, such as metal particles, inorganic particles or an inorganic fiber, and an organic resin.

(3) Method for Forming a Linear Framework

The linear framework can be formed by, for example, a method in which the coordinates of a connection point of each side for the frame form of the linear framework are calculated by a computer design system (CAD) and, based on the coordinates calculated, a material in a rod shape constituting each side (hereinafter, frequently referred to as "stick") is moved near to the coordinates of the predetermined connection point using a robot, and the ends of two sticks are connected to each other on the coordinates of the connection point using bonding means.

Alternatively, the linear framework may be formed using the method and apparatus disclosed in patent document 2.

Hereinbelow, the case where sticks are joined together to form the linear framework is described in detail.

The ends of two sticks may be bonded by welding the ends of the two sticks to each other, or may be bonded using a bonding agent.

When the solid material constituting the linear framework is a fibrous solid material, an embodiment in which a long fibrous solid material (hereinafter, frequently referred to as "filament") or the required number of filaments is or are stretched to form the linear framework may be employed (for example, FIGS. 4 and 5).

Figure 4:
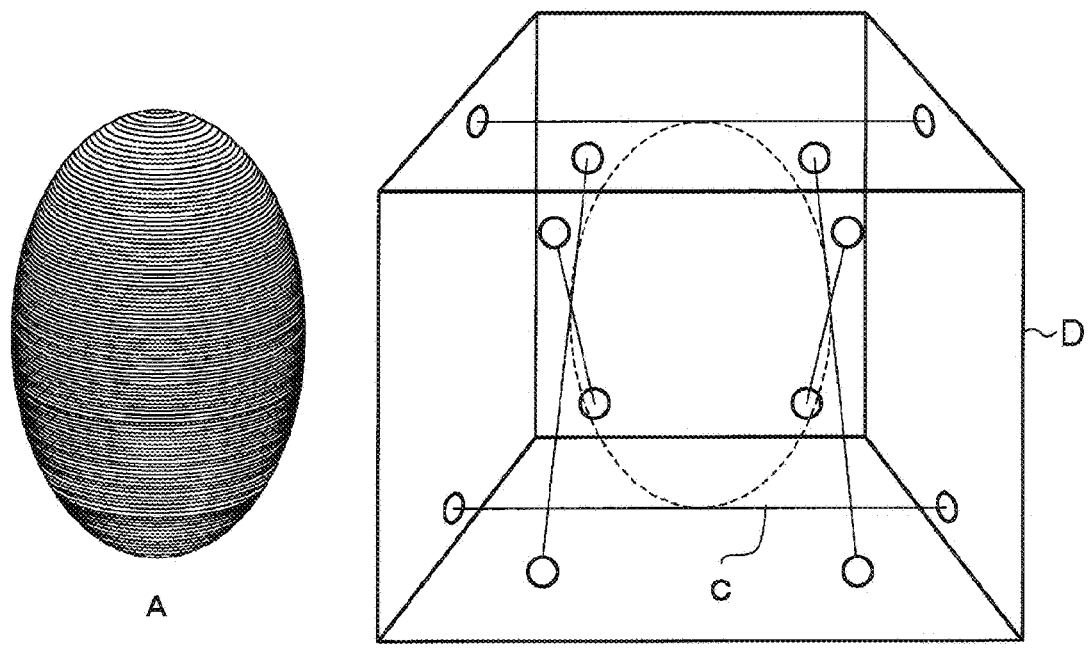
FIG. 4 is an example of an egg-shaped formed article and a frame form for the linear framework which is formed from a fiber.
Figure 5:
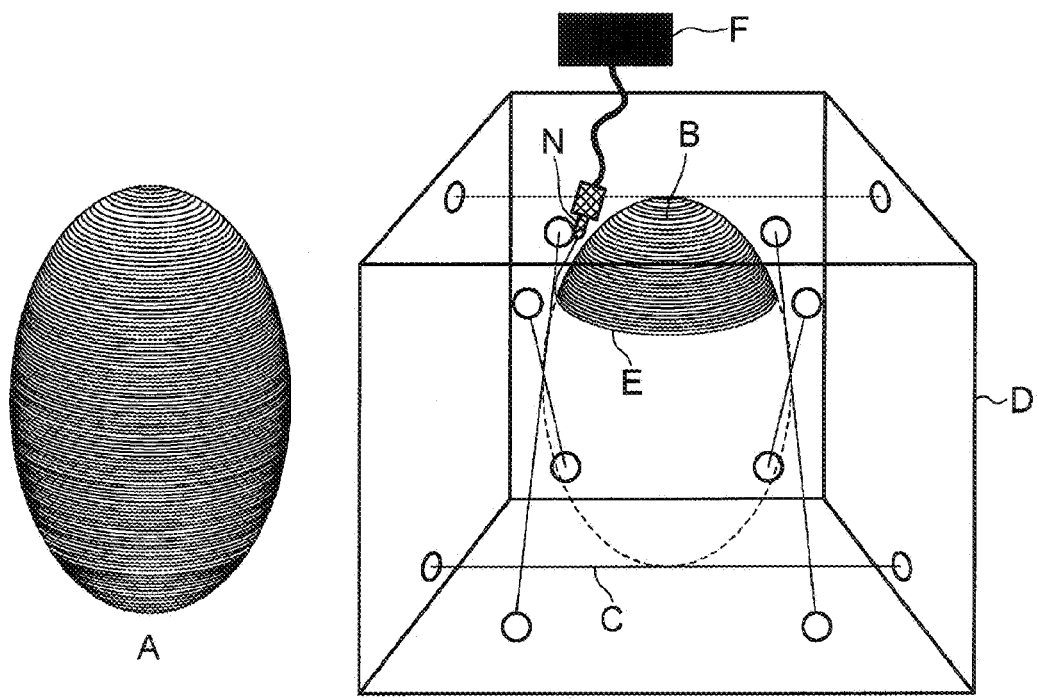
FIG. 5 is an example of the production of the egg-shaped formed article in the present invention.

When the linear framework is formed by stretching the filaments, the ends of each filament are preferably fixed to individual walls to stretch the filament between the walls (for example, FIGS. 4 and 5).

When the linear framework is formed by stretching the filaments, the ends of each filament are not fixed to the walls but held preferably by a robot head (more preferably by a plurality of robot heads, further preferably by a robot head having a form like the Thousand-handed Kannon (a statue of a multiarmed deity)) and fixed to the respectively predetermined positions to stretch the filament between the robot heads, and this method is advantageous in that a closed space using the walls is not required.

As a bonding agent, according to the material constituting the stick and the required strength and curing rate, a natural or synthetic (e.g., acrylic, epoxy, urethane, ethylene-vinyl acetate, vinyl chloride, polyimide, silicone, or a core-shell rubber modified type thereof) bonding agent may be appropriately selected, and it is preferred that the curing rate is controlled by the use of a thermo- and/or photo-setting bonding agent.

When the layer forming fiber is stacked on the linear framework to form a layer, taking into consideration the stability of the layer being formed, if necessary, the stick and a plate piece that is a planar constituent material may be used in combination. As the plate piece, a material preferably usable in the stick can be used, and the material may be a thin layer in the form of an aluminum foil or may be in the form of a plate having a certain resistance to deformation.

(4) Method for Forming a Formed Article

In the formed article having a fiber-comprised layer, the form of the formed article is formed from the fiber-comprised layer.

The inner surface and/or outer surface of the formed article may be the inner surface and/or outer surface of the fiber-comprised layer, and the inner surface and/or outer surface of the fiber-comprised layer may be further finish-coated or covered with a protecting layer.

(4-1) Method for Allowing the Layer Constituting Fiber to Adhere onto the Linear Framework Based on a desired form of the article to be formed, a linear framework is formed, and, while allowing the layer forming fiber fed from a fiber supply apparatus to adhere onto the outside or inside of the linear framework, the layer forming fiber is fixed so that the formed article has a desired form to form a fiber-comprised layer.

In this instance, the layer forming fiber may be allowed to adhere to the linear framework after completion of the formation of the linear framework, or the layer forming fiber may be allowed to adhere to the linear framework while forming the linear framework.

When it is assumed that the linear framework is not incorporated into the formed article, it is preferred that adhesion between the layer forming fiber and the linear framework is such that, an extent that, after the fiber-comprised layer is formed, the resultant fiber-comprised layer can be removed from the linear framework without breaking the fiber-comprised layer.

With respect to the means for allowing the layer forming fiber to adhere to the linear framework, when the layer forming fiber and/or the linear framework has on the surface thereof self-adhesive properties, the self-adhesive properties may be utilized. To the surface of the layer forming fiber and/or linear framework may be preliminarily applied, for example, a self-adhesive, a bonding agent having weak bonding properties, or a degradable bonding agent (hereinafter, they are collectively referred to as "adhesive"). Alternatively, an adhesive may be applied to the layer forming fiber and/or linear framework using a robot when contacting the layer forming fiber with the linear framework.

An adhesive may be either continuously applied along the layer forming fiber or sticks, or discontinuously applied by spot welding.

When the layer forming fiber is a filament or the like, for example, based on the coordinates obtained upon designing the frame form of the linear framework, a fiber supply apparatus utilizing a robot may be moved near to the coordinates to feed the layer forming fiber from the fiber supply apparatus by operating the robot, allowing the fiber to adhere to the linear framework.

As a fiber supply apparatus for the fiber which is a filament or the like, for example, an apparatus obtained by improving the fiber supply apparatus for use in an FW method or the coating supply apparatus for use in an automatic coating machine can be used.

Further, the disposition of the fiber fed from the fiber supply apparatus and the bonding positions and bonding conditions for bonding the fiber together or bonding the fiber to the linear framework are set based on the coordinates data and bonding conditions calculated in advance by, for example, CAD or a computer, and, according to the set bonding positions and conditions, the fiber supply apparatus is driven using, for example, a robot to specifically dispose the fiber, forming a layer.

The layer forming fiber may be allowed to adhere to the linear framework by a method in which while spinning a resin by a spinning machine as a fiber supply apparatus, the spun layer forming fiber is allowed to adhere to the linear framework.

The spinning may be an electrospinning method, or a fiber twine in a plane form may be formed on the linear framework while adhering to the linear framework by flash spinning used in producing nonwoven fabric.

The layer forming fiber may be fed and fixed to or adhere to the linear framework in a state such that a plurality of fibers or the fibers and the linear framework twine around each other or are knotted or knitted like a woven material.

The layer forming fiber may be disposed on the predetermined coordinates by feeding the filament by a fiber supply apparatus while contacting the filament with the linear framework, or may be disposed on the predetermined coordinates while cutting the filament into short fibers or staple fibers. In these cases, feeding the filament and feeding a resin having a bonding function for bonding the filament to another one or bonding the filament to the linear framework may be performed using a single apparatus, and feeding the filament and disposing, instead of the filament, only a resin having a bonding function on a predetermined place may be performed using a single apparatus.

It is preferred that, by the above method, while feeding a metal fiber of, for example, iron or stainless steel, the metal fiber is tack welded together, or a resin is welded and the metal fiber is disposed thereon to cure the bonded portion.

When the layer forming fiber is a metal fiber, it is preferred that the linear framework and/or the layer forming fiber is bonded by melting the linear framework and/or the layer forming fiber using high temperature energy by a method, such as laser or arc welding, so that the linear framework and/or the layer forming fiber is securely connected together.

(4-2) Method for Fixing the Layer Constituting Fiber

For stably maintaining the form of the fiber-comprised layer and imparting a predetermined strength to the fiber-comprised layer, it is preferred that the layer forming fiber is fixed together by bonding means.

The layer forming fiber may be fixed by applying a bonding agent to the layer forming fiber, or applying a bonding agent while stacking the layer forming fiber to bond together the layer forming fiber, or by melting the layer forming fiber to bond together the layer forming fiber.

When a bonding agent is used in fixing the layer forming fiber, according to the material for the fiber and the required strength and curing rate, a natural or synthetic (e.g., acrylic, epoxy, urethane, ethylene-vinyl acetate, vinyl chloride, polyimide, silicone, or a core-shell rubber modified type thereof) bonding agent may be appropriately selected, and it is preferred that the curing rate is controlled by the use of a thermo- and/or photo-setting bonding agent.

(4-3) Method for Stacking the Layer Constituting Fiber

Figure 2:
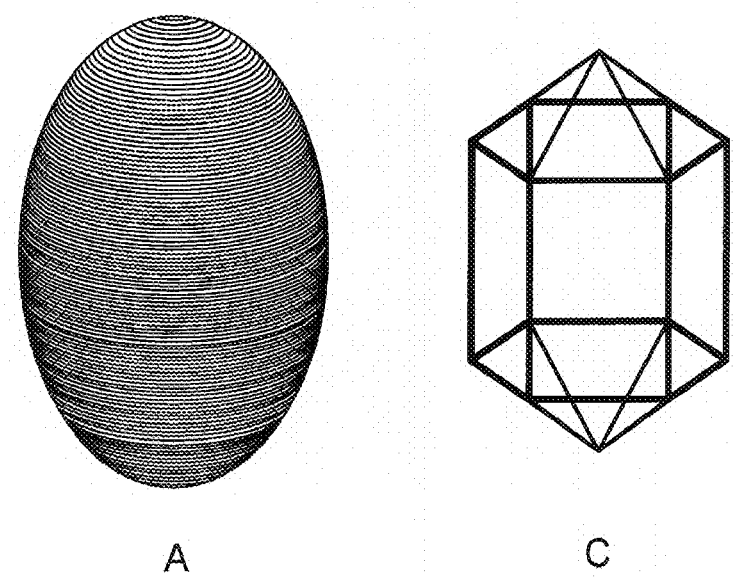
FIG. 2 is an example of an egg-shaped formed article and the linear framework thereof.

In contrast to the linear framework densely constructed as shown in FIG. 1 or the formation of a formed article having a simple form, when the linear framework is roughly constructed as shown in FIG. 2, the layer forming fiber may be allowed to successively adhere along the linear framework.

When the layer forming fiber is a filament or the like, it is preferred that the linear framework is fixed and the layer forming fiber is wound round the outside of the linear framework along the linear framework, or that the position for feeding the layer forming fiber is fixed and the layer forming fiber is wound round the outside of the linear framework along the linear framework by, for example, rotating the linear framework.

Also when the layer forming fiber is formed while spinning, it is preferred that the linear framework is fixed and a spinning machine is moved to allow the layer forming fiber spun to adhere to the outside of the linear framework along the linear framework, or that the spinning machine is fixed and the linear framework is, for example, rotated to allow the layer forming fiber spun to adhere to the outside of the linear framework along the linear framework.

Figure 7:
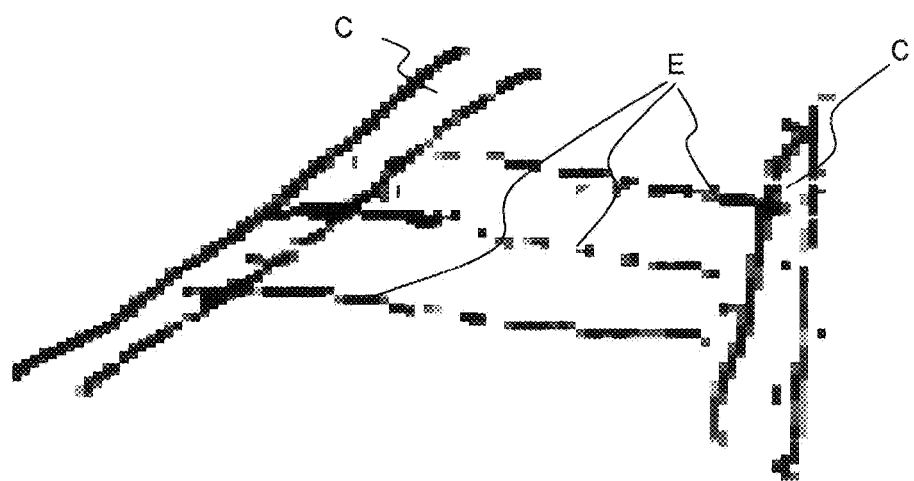
FIG. 7 is an example of the formation of a formed article by stretching a layer forming fiber E over a linear framework C.
Figure 8:
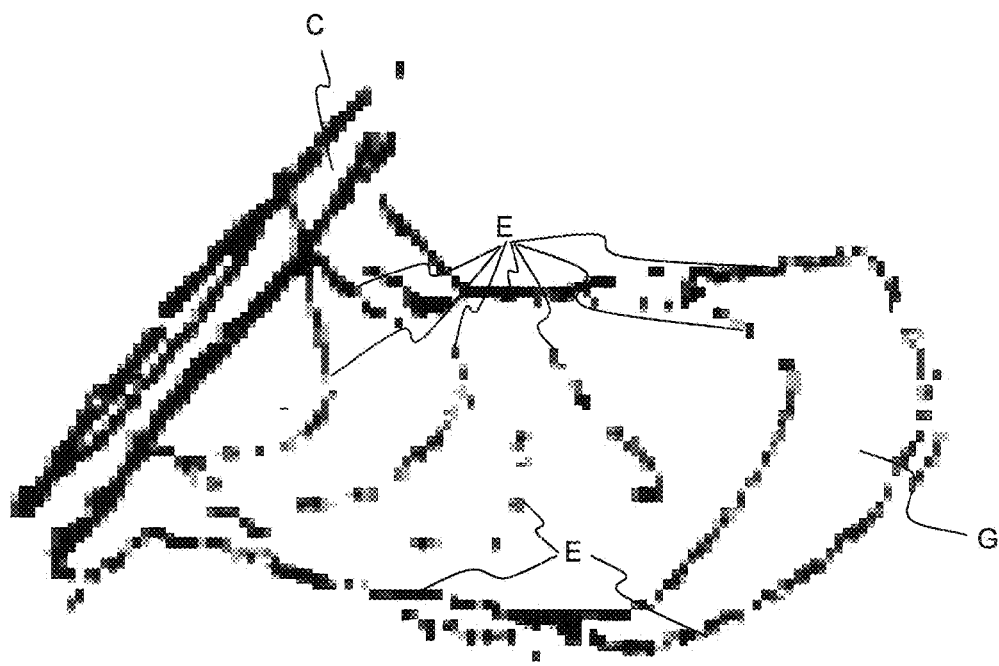
FIG. 8 is an example of the formation of a three-dimensional formed article (cladding G) by stacking or knitting layer forming fibers E from the end of a linear framework C.

On the other hand, a formed article can be formed by stretching layer forming fiber E over linear framework C (see FIG. 7), and further, a three-dimensional formed article (cladding G) can be formed by stacking or knitting layer forming fiber E from the end of linear framework C (see FIG. 8).

Figure 3:
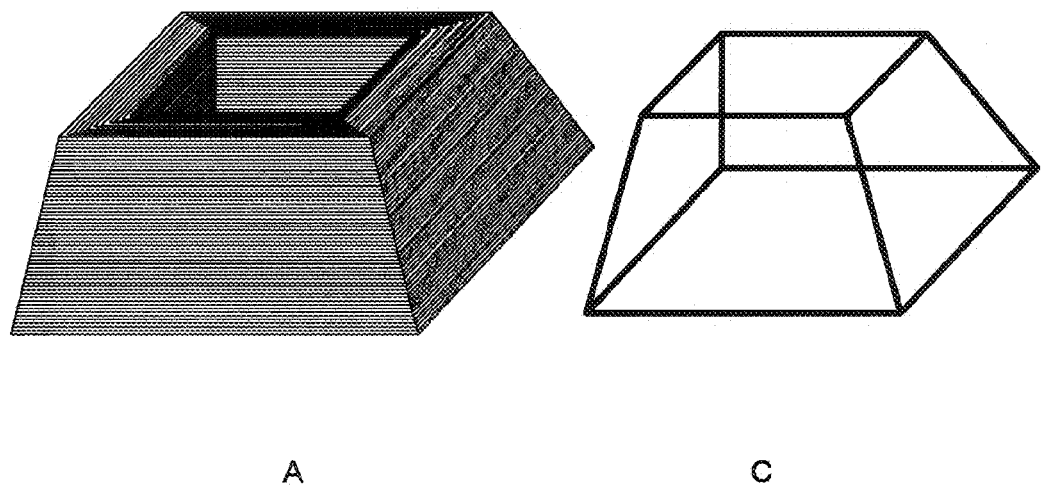
FIG. 3 is an example of a trapezoidal box-shaped formed article and the linear framework thereof.

By a method for stacking the layer constituting fiber in which, for example, using a trapezoidal linear framework shown in FIG. 3, the layer forming fiber is linearly stacked using each arris as a support, there can be produced a trapezoidal box-shaped formed article such that the upper narrow side is opened and the lower broad bottom having the layer constituting fiber stacked is closed.

A formed article, such as a trapezoidal box-shaped formed article, is difficult to produce by the conventional FW method, and when the trapezoidal box-shaped formed article is produced using a mold having a fixed form defined by plates, it is difficult to remove the solidified filling material from the mold. However, by the method of the present invention for producing a formed article, such a trapezoidal box-shaped formed article can be produced without any difficulty.

As a method for stacking the layer constituting fiber, a method such that a silkworm forms a cocoon may be employed.

For example, a method may be employed in which a fiber supply apparatus is provided inside a lattice-form linear framework shown in FIG. 4, and the linear framework is fixed and, while rotating the feed outlet of the fiber supply apparatus from left to right or vice versa with predetermined manner, the layer constituting fiber is allowed to adhere to the linear framework simultaneously with allowing the layer constituting fiber to adhere together, or the feed outlet of the fiber supply apparatus is fixed and, while rotating the linear framework from left to right or vice versa, the layer constituting fiber is allowed to adhere to the linear framework simultaneously with allowing the layer constituting fiber to adhere together.

For allowing the layer constituting fiber to adhere together, the means for allowing the layer constituting fiber to adhere to the linear framework can be employed.

The method of the present invention for producing a formed article comprises the steps of: (1) forming a linear framework as mentioned above; and (2) allowing the layer forming fiber to adhere onto the linear framework to form a formed article comprised of the fiber. Step (1) and/or step (2) may be performed in air, but, for facilitating disposition of the linear framework and layer forming fiber, step (1) and/or step (2) may be performed in a space in which the effect of gravity is eliminated and as small as possible.

As examples of the spaces in which the effect of gravity is eliminated, there can be mentioned an aerospace, such as a space in a rocket, and a space filled with a medium, such as a liquid having a high specific gravity, a powder, or a viscous liquid.

Examples of viscous liquids include a viscous aqueous solution of konjak, a thixotropic gel material, and a magnitizable fluid having dispersed therein a ferrite powder.

At the stage where the formation of the formed article is completed, the filling material constituting the space in which the effect of gravity is eliminated is preferably removed and can be reused if possible.

In the above-mentioned medium, a curing resin liquid incompatible with the medium may be dispersed to cure the resin liquid, forming the linear framework or layer forming fiber.

From the viewpoint of enabling the resin liquid to be cured when needed, the curing resin liquid is preferably curable with energy, and a resin liquid of, for example, an electromagnetic, e.g., infrared curing type, an ultrasonic curing type, or a thermosetting type can be used and cured by an action of an electromagnetic wave, a laser, an ultrasonic wave, or heat.

Embodiment Example 1

Embodiment Example 1 of the present invention is described with reference to FIG. 5.

(The rest is omitted.)

Character A indicates an embodiment of the finished formed article.

Character B indicates an embodiment of an egg-shaped formed article which is being formed.

Character C indicates a fibrous linear framework.

Character D indicates a planar fixing frame for fixing linear framework C, which is a rectangular parallelopiped box formed from four vertical faces.

Such a box may secure faces required for fixing framework C, and may be in a cylindrical shape, a triangular prism shape, or a polygonal prism shape, and an unnecessary face may be opened.

The faces may be opaque, but, in the Example, the faces are shown transparent so that the operations performed inside the frame can be seen. The ends of linear framework C are individually fixed to the respective positions on the faces of frame D (positions shown in an elliptic figure) so that an egg-shaped formed article can be formed.

Character E indicates a layer forming fiber.

Character F indicates a fiber supply apparatus for the layer forming fiber.

Layer forming fiber E is discharged from nozzle N of fiber supply apparatus F having nozzle N in accordance with the discharge conditions preset so that an egg-shaped formed article can be formed.

The discharge angle and discharge speed upon discharging layer forming fiber E are controlled by, for example, a computer so that layer forming fiber E adheres to linear framework C stretched around the positions preset so that an egg-shaped formed article can be formed, while forming a layer on the preset coordinates of the formed article.

Further, when layer forming fiber E is adhering to linear framework C while forming a layer, linear framework C and layer forming fiber E are bonded together using a bonding agent and fixed.

With respect to the bonding using a bonding agent, for example, when discharging layer forming fiber E from the nozzle, a photosetting thermosetting bonding agent is applied to the discharged layer forming fiber E by bonding agent applying means (not shown), and the photosetting thermosetting bonding agent may be cured by irradiating light when a layer forming fiber E being stacked, or, after a fiber-comprised layer is formed, the photosetting thermosetting bonding agent may be cured by irradiating light and heating the layer.

Layer forming fiber E is stacked to form a formed article in the preset egg shape, and the bonding agent is cured and then, linear framework C is removed from the formed article, and the formed article is taken out from fixing frame D, thus completing the production.

The materials and sizes of C, D, and E, and the type of G and the system of F are determined, taking into consideration the predetermined mechanical properties and physical and chemical properties of the formed article.

Embodiment Example 2

Embodiment Example 2 of the present invention is described with reference to FIG. 6.

Figure 6:
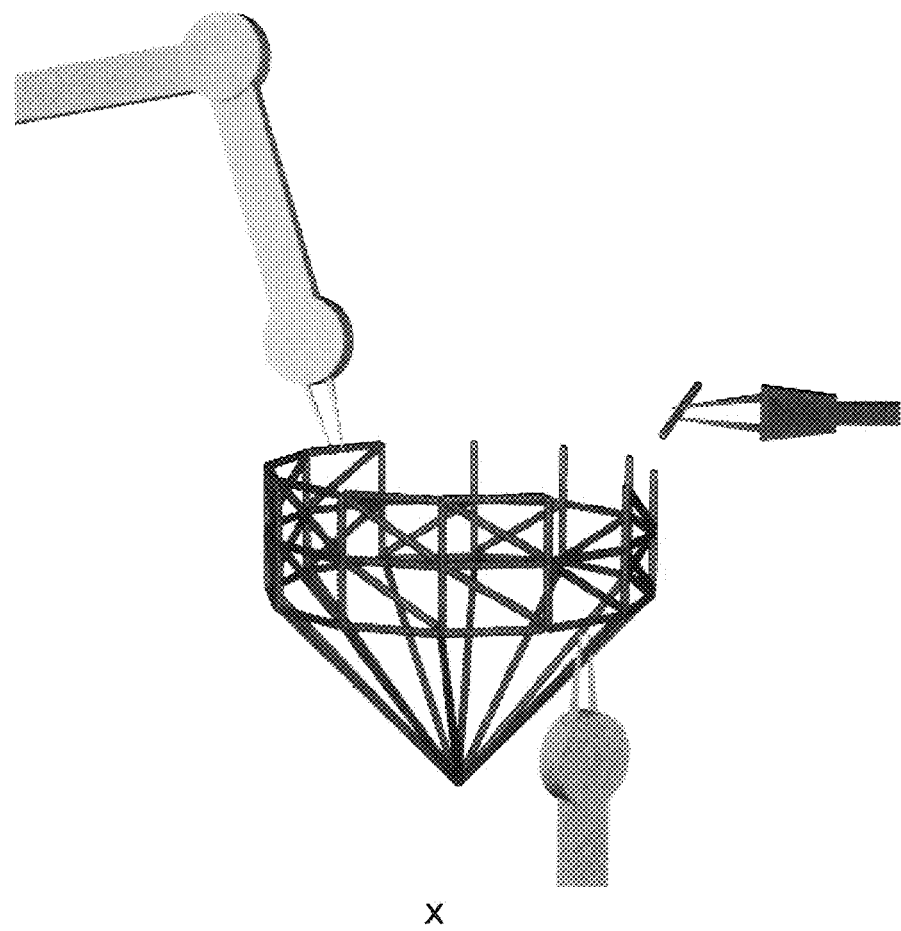
Figure 1:
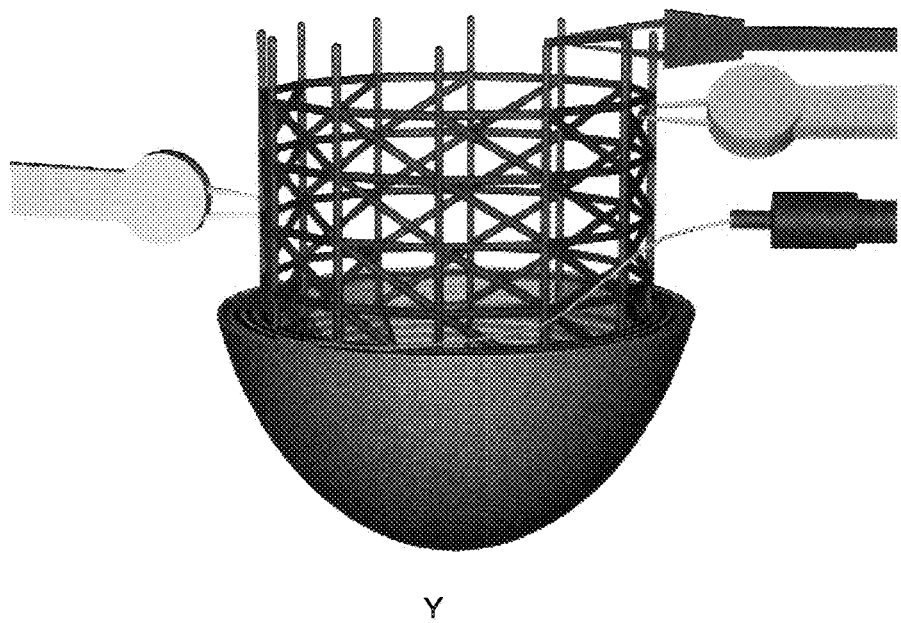
Figures 2, 6:
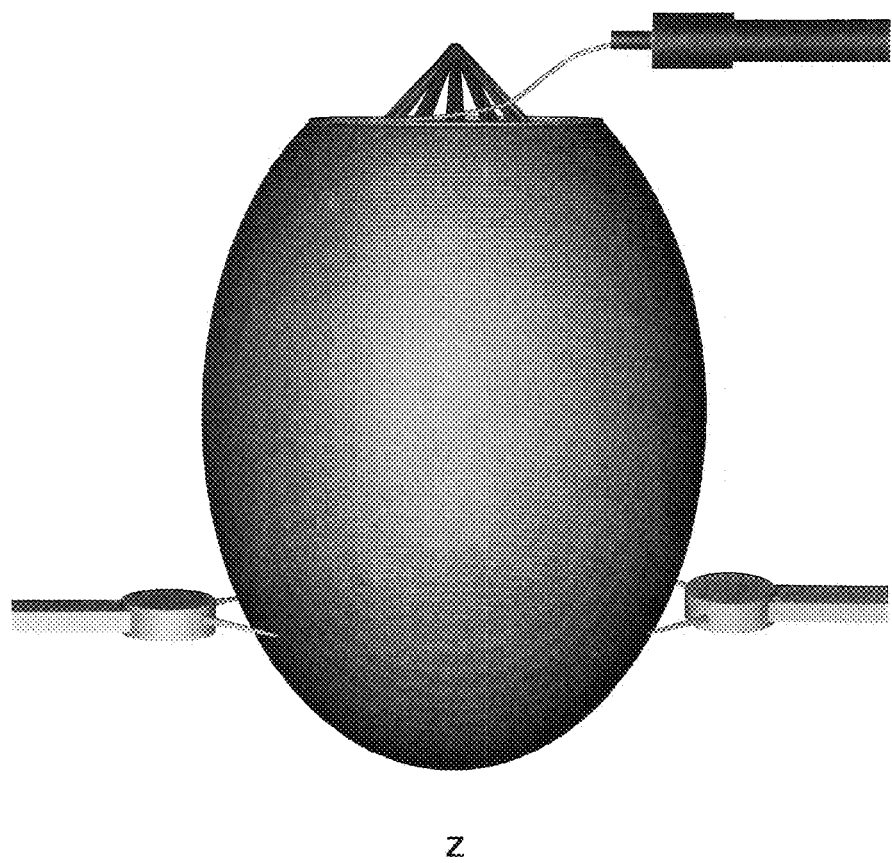

In Embodiment Example 2 shown in FIG. 6, a process is reproduced by computer graphics in which, while moving individual sticks by a robot head to the respective positions on the predetermined coordinates and bonding them together to form a linear framework of a hexagonal prism form similar to the linear framework shown in FIG. 2, a filament as a layer forming fiber is wound round and bonded to the linear framework.

FIG. 6X shows the state in which ⅓ of the formation of the formed article is done, FIG. 6Y shows the state in which ⅔ of the formation of the formed article is done, and FIG. 6Z shows the state immediately before completion of the formation of the formed article.

In each case, step (1) for forming a linear framework is performed in parallel with step (2) for allowing the fiber to adhere onto the linear framework to form the layer.

By the present invention, a formed article, for example, a large-sized article, such as an exterior trim part for a rocket, an aircraft, a tanker, a train car, or an automobile, a medium- or small-sized article, such as a part for a rocket, an aircraft, a tanker, a train car, or an automobile, or an article on the scale of a human body, e.g., a tool, a clothing item, such as boots, accessories, or a medical device, such as an artificial organ, can be formed without using a mold having a fixed form.

The invention claimed is:

1. A method for producing a formed article having a layer comprising a fiber, the method comprising the steps of:
   (1) forming a linear framework; and
   (2) adhering the fiber onto the linear framework to form the layer, wherein the linear framework is a fibrous solid material,
   wherein the linear framework has a structure in which the fibrous solid material has a plurality of filaments which are stretched to form the linear framework, and
   wherein during the stretching, the ends of each filament are held by a plurality of robot heads, and are fixed to respectively predetermined positions to stretch each filament between the robot heads.

2. The method for producing a formed article according to claim 1, wherein the fiber is an organic fiber.

3. The method for producing a formed article according to claim 1, wherein the fiber is at least one fiber selected from a group consisting of a metal fiber, an inorganic fiber and an organic fiber.

4. The method for producing a formed article according to claim 1, wherein the fiber is an organic fiber, and the organic fiber is made from at least one substance selected from a group consisting of polyethylene, polypropylene, polyester, polyimide and flax.

5. The method for producing a formed article according to claim 1, wherein the fibrous solid material is at least one material selected from the group consisting of a monofilament, a unidirectional yarn and a spun yarn.

6. The method for producing a formed article according to claim 1, wherein, in the step (2), the layer is formed based on coordinates of the linear framework, wherein a fiber supply apparatus utilizing a robot is moved to the coordinates to feed the fiber from the fiber supply apparatus by operating the robot, thereby adhering the fiber onto the linear framework.

7. The method for producing a formed article according to claim 1, wherein, in the step (2), the layer is formed by fixing the linear framework and winding the fiber around the outside of the linear framework along the linear framework.

8. The method for producing a formed article according to claim 1, wherein, in the step (2), the layer is formed by fixing the position for feeding the fiber and winding the fiber around the outside of the linear framework along the linear framework by rotating the linear framework.

9. A method for producing a formed article having a layer comprising a fiber, the method comprising the steps of:
  (1) forming a linear framework; and
  (2) adhering the fiber onto the linear framework to form the layer,
    wherein the linear framework is a fibrous solid material,
    wherein the linear framework has a structure in which the fibrous solid material has a plurality of filaments which stretched to form the linear framework, and
    wherein during the stretching, the ends of each filament are fixed to individual walls of a planar fixing frame to stretch the filaments between the walls.

* * * * *